(12) United States Patent
Lefevre

(10) Patent No.: US 7,022,406 B1
(45) Date of Patent: Apr. 4, 2006

(54) BREATHABLE FILM COVER FOR WINDOW PANES

(75) Inventor: Carine Lefevre, Evere (BE)

(73) Assignee: Morgan Adhesives Company, Stow, OH (US)

( * ) Notice: Subject to any disclaimer, the term of this patent is extended or adjusted under 35 U.S.C. 154(b) by 0 days.

(21) Appl. No.: 10/808,115

(22) Filed: Mar. 24, 2004

(51) Int. Cl.
*B32B 5/16* (2006.01)
*B32B 27/30* (2006.01)

(52) U.S. Cl. ............... 428/328; 428/343; 428/518; 428/520; 428/522

(58) Field of Classification Search ............... 428/328, 428/343, 518, 520, 522
See application file for complete search history.

(56) References Cited

U.S. PATENT DOCUMENTS

| | | | |
|---|---|---|---|
| 4,361,625 A | 11/1982 | Beckmann et al. ............ 27/36 |
| 4,550,058 A | 10/1985 | Collins et al. ............... 428/412 |
| 4,781,976 A * | 11/1988 | Fujita et al. ............ 428/318.6 |
| 5,235,358 A | 8/1993 | Mutzhas et al. |
| 5,247,019 A | 9/1993 | Cozens et al. |
| 5,258,232 A | 11/1993 | Summers et al. ................ 15/8 |
| 5,491,586 A | 2/1996 | Phillips |
| 5,496,630 A * | 3/1996 | Hawrylko et al. ......... 428/328 |
| 5,541,239 A | 7/1996 | Heywood, Jr. |
| 5,642,222 A | 6/1997 | Phillips |
| 5,861,211 A | 1/1999 | Thakkar et al. ................. 27/6 |
| 5,925,437 A | 7/1999 | Nelson |
| 6,042,924 A | 3/2000 | Paulus et al. |
| 6,155,689 A | 12/2000 | Smith |
| 6,212,805 B1 | 4/2001 | Hill |
| 6,254,712 B1 | 7/2001 | Enlow et al. |
| 6,270,887 B1 | 8/2001 | Stocq et al. ..................... 7/12 |
| 6,296,732 B1 | 10/2001 | Enlow et al. |
| 6,336,988 B1 | 1/2002 | Enlow et al. |
| 6,402,875 B1 | 6/2002 | Lühmann et al. |
| 6,420,020 B1 | 7/2002 | Yamazaki et al. |
| 6,481,857 B1 | 11/2002 | Smith |
| 6,531,215 B1 | 3/2003 | Yamazaki et al. |
| 2002/0037402 A1 | 3/2002 | Yamazaki et al. |
| 2002/0176983 A1 | 11/2002 | Yamazaki et al. |
| 2004/0027704 A1 | 2/2004 | Richard |

OTHER PUBLICATIONS

Morgan Adhesives Company Ad, "Stay Cool, Save Energy with MACtac®" MAC4015 (Feb. 2003), 2 pages.

* cited by examiner

*Primary Examiner*—D. S. Nakarani
(74) *Attorney, Agent, or Firm*—Barnes & Thornburg LLP; Timothy J. Engling

(57) ABSTRACT

Breathable multilayer film covers for window panes that reflect light and/or absorb ultraviolet rays. The film cover blocks UV rays and some light, and it reflects solar heat. The breathable film cover has at least two film layers. An outer film is a polymeric transparent film incorporating UV stabilizers. An inner film is a polymeric film that contains internal metal particles and preferably UV stabilizers. An adhesive, preferably also incorporating UV stabilizers, is applied as a layer to the multilayer film so that the breathable film cover can be adhered to window structures. To form a covered window pane, the multilayer film is adhered to a plate.

8 Claims, 1 Drawing Sheet

BREATHABLE FILM COVER FOR WINDOW PANES

BACKGROUND

The present disclosure relates to breathable film covers for window structures. More particularly, the disclosure relates to breathable multilayer film covers that reflect light or absorb ultraviolet rays.

In designing buildings, natural light is a consideration for architects, builders and owners. Allowing natural light into buildings is an attractive construction option. But the sunlight causes heat, increasing energy consumption and cooling costs. Rather than sacrificing the beauty of natural light for energy savings, window film covers can be applied to existing or new windows for energy savings and other benefits.

Film covers for window structures have been used to filter ultraviolet (UV) rays and/or reflect light from a window pane. Solar control films limit incoming light and UV rays and reduce glare. Polymeric films, such as polyester, polyethylene and polypropylene, have been used. Solar control films can reduce energy costs, lower energy consumption, minimize glare, minimize fabric fading, and reduce eye strain. Many window films perform these functions only for glass windows.

Window panels, plates and panes can be made out of materials other than glass, such as plastic materials including polycarbonate, polyacrylate, and polymethyl methacrylate (PMMA). Such plastic materials are strong, lightweight, shatter-proof and clear, and they may be used for window structures such as skylights, verandas, sunrooms and the like.

Certain problems may develop when metalized polymeric films are attached to polycarbonate, polyacrylate and PMMA plates. Bubbles, craters or tunneling may appear when certain metalized films are applied to plastic plates. Plastic plates, such as polycarbonate and polyacrylate plates, contain moisture that may create defects at the interface of the adhesive/film and the plate when the plate has moisture escape. Defects may appear in a polymeric film that is impervious to moisture.

U.S. Pat. No. 6,270,887 discloses a breathable film that allows moisture to escape to minimize objectionable bubbles, craters and tunnels at the interface between the film and the plastic plate. That patent discloses a metalized polymeric film that is breathable and capable of adhering to polycarbonate and polyacrylate plates without developing bubbles, craters or tunnels as a result of moisture escaping from the plastic plate material.

U.S. Pat. No. 6,270,887 discloses a metalized plasticized polyvinyl chloride (PVC) film, wherein the plasticized PVC film has a metallization coating. An adhesive including a UV absorber forms a layer on the metallization coating. An anti-scratch/anti-static coating is provided on the other surface of the PVC film that does not include the metallization coating. The plasticized PVC film with the metallization coating is permeable to water and allows moisture to escape from the plastic window structures. The film also can act as a light shield or as a UV filter.

SUMMARY

The present disclosure is for a breathable film cover for window panes. The film is translucent, allowing viewing through the window and some light transmission. The film blocks UV rays and some light, and it continuously reflects solar heat. The film can reduce energy costs, lower energy consumption, minimize glare, minimize fabric fading, and reduce eye strain. The film can adhere to plates of glass or plastic or other suitable materials.

The breathable film cover has at least two films co-calendared together. An outer film is a polymeric PVC transparent film incorporating a high quantity of UV stabilizers. An inner film is a polymeric PVC film that contains metal particles and preferably UV stabilizers. The inner film contains metallic particles that have been mixed with the PVC master batch. An adhesive, preferably also incorporating UV stabilizers, is applied as a layer to the co-calendared multilayer film so that the breathable film cover can be adhered to window structures.

One breathable film is a multilayer film preferably with two co-calendared PVC films, one of which is clear with a high quantity of UV stabilizers and a second PVC film that incorporates metal particles and UV stabilizers. The present disclosure includes a film layer that is PVC film containing internal metallic particles, which avoids a metallization coating over a plasticized PVC film. The internal metal particles reduce a majority of the incoming UV rays.

The film is breathable so that bubbles, craters or tunneling do not develop from moisture between the film and a window plate. Moisture escaping from a polycarbonate or polyacrylate plate will pass through the adhesive and both PVC film layers.

BRIEF DESCRIPTION OF THE DRAWING

The features of this disclosure and the manner of obtaining them will become more apparent, and the disclosure itself will be best understood by reference to the following description of embodiments of the breathable film cover taken in conjunction with the accompanying drawing in which.

DETAILED DESCRIPTION

Figure 1:
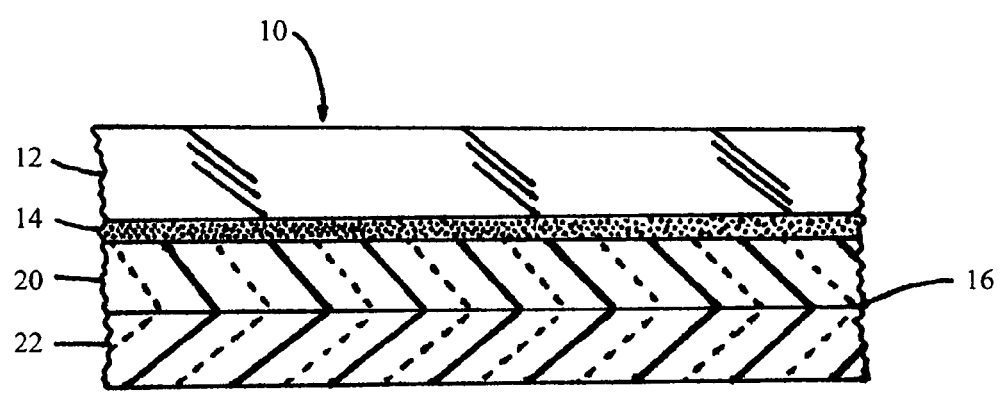
FIG. 1 is a cross sectional view of a film cover for window panes.

While the present invention will be fully described hereinafter with reference to the accompanying drawing, in which a particular embodiment is shown, it is to be understood at the outset that persons skilled in the art may modify the embodiment disclosed herein while still achieving the desired result. Accordingly, the description that follows is to be understood as a broad informative disclosure directed to persons skilled in the appropriate art and not as limitations of the present disclosure.

FIG. 1 shows a covered window pane 10 including a plate 12 defining a window pane or other structure. An adhesive 14 secures a multilayer film 16 to plate 12. The multilayer film 16 includes a first polymeric film layer 20 incorporating metal particles and a second polymeric film layer 22 incorporating UV stabilizers. The first film layer 20 is polyvinyl chloride (PVC), and the second polymeric film layer 22 is also PVC for compatibility between the film layers. Film layer 20 is translucent, and film layer 22 is preferably clear. Both film layers 20 and 22 and the adhesive 14 are permeable to moisture. The multilayer film 16 is preferably UV stabilized, very cohesive, durable, and resistant to water, detergents and alcohols. The multilayer film 16 with an adhesive 14 forms a breathable film cover for window structures.

The multilayer film 16 can adhere to plates of glass, plastic or other window structures. The plate 12 can be made of polycarbonate, polyacrylate or polymethyl methacrylate (PMMA), from which moisture may escape. The multilayer film 16 is also suitable with glass reinforced plastic. Polymeric plates for window structures are known in the art and are typically transparent or translucent, but may require breathable films as solar control films.

One multilayer film 16 includes two polymeric film layers 20 and 22 co-calendared together. The first polymeric film layer 20 includes metal particles and preferably UV stabilizers. The second polymeric film layer 22 incorporates UV stabilizers and ideally is the outermost layer from the plate 12. The second polymeric film layer 22 is clear and ideally provides abuse protection. Both film layers 20 and 22 are breathable film layers and are permeable to water and allow moisture to escape from the plate 12. The top clear PVC film layer 22 increases the durability of the multilayer film 16 and enhances the life of the covered window pane 10 in applications exposed to abuse or the environment.

A first polymeric PVC film layer contains metallic particles that have been mixed with the PVC in a master batch used to form the film. An 80 or 100 μm-thick film layer has been found suitable. A second film in a two-layer film may be a 100 μm-thick transparent PVC film containing a high quantity of UV stabilizers. The first polymeric PVC film layer and the second polymeric PVC film layer form a stabilized film. The multilayer film 16 is preferably a two-layer film to simplify construction and minimize costs, but it is contemplated that additional layers that are breathable could be added to the window structure and remain within the scope of this invention.

Adhesive layer 14 adheres the multilayer film 16 to the plate 12. Preferably, the adhesive 14 includes a UV absorber and a UV stabilizer. A 40 μm adhesive layer has been found suitable. The adhesive is preferably an acrylic adhesive that may either permanently or temporarily adhere the multilayer film 16 to the plate 12. The multilayer film 16 can be coated with a permanent acrylic adhesive with excellent wet-out characteristics for clarity or a semi-permanent acrylic adhesive designed for clean removability. Adhesive 14 is also formulated to be water permeable so that moisture may escape from the plate 12. A preferred acrylic adhesive is a solvent-based, clear, pressure sensitive adhesive. Adhesive data for one example follows:

| ADHESIVE DATA | Typical values | Test method |
| --- | --- | --- |
| Quick Tackon glass (N/25 mm) | 25 | FTM9 |
| Peel 180° on glass (N/25 mm) | | |
| after 30 minutes | 14 | FTM1 |
| after 24 hours | 15 | FTM1 |
| Shear on glass (hours) 1 kg-25 mm × 25 mm | 500 | FTM8 |

The multilayer film 16 can be used for applications on internal or external surfaces of both glass and plastic substrates. Although the terms "plates" and "panes" are used, the multilayer film can be applied to non-flat surfaces, such as curved skylights, which is meant to be included in these terms. Window and skylight manufacturers can apply the multilayer film 16 during the manufacturing process to various surfaces of a manufactured product.

The multilayer film 16 or the adhesive 14 provide a shield or a filter for light and/or UV rays. The stabilizers and absorbers can be added in any combination of film layer or adhesive. The multilayer film 16 and the adhesive 14 reduce the majority of incoming solar heat, eliminate a majority of the glare, and block nearly all incoming UV rays.

The solar properties were measured by an outside laboratory on a film designated "Permasun outdoor 5" per this disclosure, and the film applied on a clear 4 mm glass, in accordance to the EN061 test method. The solar properties follow:

| | Permasun outdoor 5 film (non applied) | Permasun outdoor 5 Laminated to the external of a 4 mm clear glass. |
| --- | --- | --- |
| Visible Light transmitted | 17.3% | 16.7% |
| Visible light reflected | 41.2% | 40.3% |
| Visible light absorbed | 41.4% | 43.0% |
| Ultra Violet block | 99.8% | 99.9% |
| Total solar energy reflected | 39.1% | 38.3% |
| Total solar energy transmitted | 16.2% | 14.5% |
| Total solar energy absorbed | 44.7% | 47.2% |
| Shading coefficient | — | 0.31 |

Visible light transmitted, reflected or absorbed: the percent of total visible light (380–780 nanometers) to be passed, reflected or absorbed.
Ultra Violet block: the percent of UV radiation (240–380 nanometers) to be passed.
Total solar energy transmitted, reflected or absorbed: the percent of total energy to be passed, reflected or absorbed.
Shading coefficient: the ratio of solar heat gain through a glazing system to the solar heat gain under the same conditions for clear unshaded glazing (87%). It defines the sun control capability of the glazing system (of the film or the shading).

The method of forming a breathable film cover includes forming a first polymeric PVC film from a master batch including plasticized polyvinyl chloride, metal particles and preferably UV stabilizers. A second clear polymeric PVC film, including UV stabilizers, is also formed. The first film layer 20 and the second film layer 22 are co-calendared together to form a multilayer film 16. An adhesive 14 is applied on the surface of the polymeric film layer including the metal particles. A release liner (not shown) is normally applied over the adhesive for easy transport and application of the breathable film to a plate 12. A release liner can offer stability and lay flat characteristics, and may be a clear PET 36 μm liner. When used, the release liner would be removed exposing the adhesive allowing the multilayer film 16 to be adhered to the plate 12. To form a covered window pane 10, the multilayer film 16 is adhered to a plate 12.

Although preferred embodiments of the disclosure are illustrated and described in connection with particular features, it can be adapted for use with a wide variety of window structures, films, adhesives, and methods. Other embodiments and equivalent film covers and methods are envisioned within the scope of the claims. Various features of the disclosure have been particularly shown and described in connection with illustrated embodiments. However, it must be understood that the particular embodiments merely illustrate and that the invention is to be given its fullest interpretation within the terms of the claims.

What is claimed is:

1. A breathable film cover for window structures comprising:
   a first polymeric polyvinyl chloride film layer including internal metal particles and UV stabilizers;
   a second polymeric polyvinyl chloride film layer secured to the first polymeric polyvinyl chloride film layer; wherein the second polymeric polyvinyl chloride film layer incorporates UV stabilizers and wherein the second polymeric polyvinyl chloride film layer is a clear stabilized film and an adhesive layer applied to a surface of the first polymeric polyvinyl chloride film layer, wherein the first polymeric polyvinyl chloride film layer, the second polymeric polyvinyl chloride film layer and the adhesive layer are permeable to moisture.

2. The film cover of claim 1 wherein the adhesive layer incorporates UV stabilizers.

3. The film cover of claim 1 wherein the adhesive has an ultraviolet light absorber.

4. The film cover of claim 1 wherein the adhesive layer is an acrylic adhesive.

5. The film cover of claim 1 wherein the adhesive layer is a clear pressure sensitive adhesive.

6. A breathable film cover for window structures comprising:
   a film including
       a first translucent polymeric polyvinyl chloride film layer including internal metal particles and UV stabilizers;
       a second clear polymeric polyvinyl chloride film layer secured to the first translucent polymeric polyvinyl chloride film layer; the second clear polymeric polyvinyl chloride film layer incorporating UV stabilizers, and
   an adhesive layer applied to a surface of the first translucent polymeric polyvinyl chloride film layer, the adhesive layer including UV stabilizers;
   wherein the first translucent polymeric polyvinyl chloride film layer, the second clear polymeric polyvinyl chloride film layer and the adhesive layer are permeable to moisture.

7. The film cover of claim 6 wherein the adhesive layer is an acrylic adhesive.

8. The film cover of claim 6 wherein the adhesive layer is a clear pressure sensitive adhesive.

* * * * *